(12) United States Patent
Friedman et al.

(10) Patent No.: US 9,942,042 B1
(45) Date of Patent: Apr. 10, 2018

(54) KEY CONTAINERS FOR SECURELY ASSERTING USER AUTHENTICATION

(71) Applicant: EMC Corporation, Hopkinton, MA (US)

(72) Inventors: Lawrence N. Friedman, Arlington, MA (US); Kayvan Alikhani, Berkeley, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 138 days.

(21) Appl. No.: 15/073,944

(22) Filed: Mar. 18, 2016

(51) Int. Cl.
  *G06F 7/04* (2006.01)
  *H04L 9/32* (2006.01)
  *G06F 21/31* (2013.01)
  *H04L 9/08* (2006.01)

(52) U.S. Cl.
  CPC .............. *H04L 9/321* (2013.01); *G06F 21/31* (2013.01); *H04L 9/0891* (2013.01); *H04L 9/3226* (2013.01); *H04L 9/3231* (2013.01); *H04L 9/3247* (2013.01)

(58) Field of Classification Search
  CPC .............. H04L 9/00; H04L 9/63; G06F 21/30
  USPC ........... 726/1–5; 713/150–155; 380/280–282
  See application file for complete search history.

(56) References Cited

U.S. PATENT DOCUMENTS

| | | | | |
|---|---|---|---|---|
| 8,316,237 B1* | 11/2012 | Felsher | ................. | H04L 9/0825 380/282 |
| 9,172,541 B2* | 10/2015 | Kolluru | ................... | G06F 21/33 |
| 2007/0038857 A1* | 2/2007 | Gosnell | ............. | G06F 17/30067 713/165 |
| 2010/0281273 A1* | 11/2010 | Lee | .......................... | G06F 21/72 713/190 |
| 2011/0167503 A1* | 7/2011 | Horal | ...................... | G06F 21/10 726/33 |
| 2012/0066508 A1* | 3/2012 | Lentini | ................. | G06F 19/323 713/186 |
| 2012/0266209 A1* | 10/2012 | Gooding | ................ | H04L 63/20 726/1 |

(Continued)

OTHER PUBLICATIONS

Bare, Christopher J., "Attestation and Trusted Computing", CSEP 590: Practical Aspects of Modern Cryptography, Mar. 2006, 9 pages.

(Continued)

*Primary Examiner* — Carl Colin
*Assistant Examiner* — Viral Lakhia
(74) *Attorney, Agent, or Firm* — BainwoodHuang (57) ABSTRACT

A digitally signed authentication assertion is generated in response to successful authentication of a current user of a user device by using a signing key that is uniquely assigned to the authenticator process to digitally sign a document indicating that the current user of the user device was successfully authenticated on the user device. The signing key uniquely assigned to the authenticator process is stored in a key container associated with the user device, and the key container is located on a key container server that is physically separate from the user device. The digitally signed authentication assertion is conveyed from the authenticator process to an authentication service, in order to securely indicate to the authentication service that the current user of the user device has been verified as an authentic user by the authenticator process.

15 Claims, 6 Drawing Sheets

(56) References Cited

U.S. PATENT DOCUMENTS

| | | | | |
|---|---|---|---|---|
| 2012/0278869 A1* | 11/2012 | Guccione | ............ | H04L 63/104 726/5 |
| 2013/0262857 A1* | 10/2013 | Neuman | ................ | H04L 63/08 713/155 |
| 2014/0033310 A1* | 1/2014 | Cheng | ................ | H04L 63/1408 726/23 |
| 2014/0075522 A1* | 3/2014 | Paris | ...................... | G06F 21/44 726/5 |
| 2014/0196127 A1* | 7/2014 | Smeets | ............. | H04L 63/0815 726/5 |
| 2014/0283032 A1* | 9/2014 | Rash | ...................... | G06F 21/57 726/22 |
| 2015/0121506 A1* | 4/2015 | Cavanaugh | ............ | G06F 21/62 726/16 |
| 2015/0237031 A1* | 8/2015 | Neuman | ................ | H04L 63/08 713/176 |
| 2016/0099811 A1* | 4/2016 | Hawblitzel | .......... | G06F 21/575 713/176 |
| 2017/0012770 A1* | 1/2017 | Lin | ...................... | G06F 21/572 |
| 2017/0012945 A1* | 1/2017 | Poffenbarger | ...... | H04L 63/0428 |
| 2017/0187752 A1* | 6/2017 | Schulz | ................... | H04L 63/20 |

OTHER PUBLICATIONS

Ferraiolo et al., "Mobile, PIV, and Authentication", National Institute of Standards and Technology Interagency Report 7981; National Institute of Standards and Technology, Mar. 2014, 14 pages.

Shpantzer, Gal, "Implementing Hardware Roots of Trust: The Trusted Platform Module Comes of Age", SANS Analyst Program, SANS Institute InfoSec Reading Room, SANS Institute, Jun. 2013, 17 pages.

* cited by examiner

KEY CONTAINERS FOR SECURELY ASSERTING USER AUTHENTICATION

BACKGROUND

In a distributed computing environment, a remotely hosted network resource (e.g. a Web site, service, application, etc.) may require that a user be authenticated on their user device before they are granted access to the network resource. Existing user devices have responded to requests to authenticate a current user by performing an authentication process to authenticate the user, and then used a locally stored key to digitally sign an indication that the user of the device has been successfully authenticated. For example, some existing user devices have digitally signed an indication of successful user authentication using a locally stored private key of a public and private key-pair that is uniquely assigned to the device. This digitally signed authentication indication was conveyed from the user device to the authentication requestor, in order to provide an indication that the user was successfully authenticated by the user device.

Security of the locally stored private key used to sign authentication indications has been provided in previous user devices through hardware-based security mechanisms. Such hardware-based security mechanisms are sometimes referred to as "hardware-roots of trust." Examples of hardware-based security mechanisms include i) embedding the private key within the hardware or firmware of the user device, and/or ii) only using the private key to sign the authentication indication within processes executing in a hardware-protected secure execution region of the user device.

SUMMARY

Unfortunately, employing hardware-based security mechanisms to maintain the security of a locally stored private key used to digitally sign indications of successful user authentication has significant drawbacks. First, in many user devices applicable hardware-based security mechanisms are not present. For example, many user devices do not support embedding a private key within the hardware or firmware of the device, and/or do not provide a hardware-protected secure execution region. Second, even when a user device does include a hardware-based security mechanism, the hardware-based security mechanism may only be available to a limited sub-set of the processes executing on the device. For example, a user device's hardware-protected execution region may include a separate process space that can only be accessed by software applications or processes that have previously been "certified" by the manufacturer of the device, or by the manufacturer of the device's operating system. Accordingly, secure execution regions may not be accessible to non-certified processes (e.g. applications) executing within the device, including non-certified application program code that operates to authenticate the current user of the device. Moreover, a device's secure execution region may not provide the rich execution environment generally available to applications running on the device. As a result, on many user devices, hardware-based security mechanisms are not an option for protecting a key used to sign authentication assertions. Without hardware-based security mechanisms, locally stored private key or keys used to digitally sign authentication assertions are vulnerable to attack, e.g. by malicious processes (i.e. "malware"). If successful, such attacks can result in creation of a fraudulent indication that a user of the device has been successfully authenticated, and allow unauthorized access to an otherwise secure network resource. Moreover, since typical user devices (e.g. smartphones, etc.) may easily be lost or stolen, they may be subject to malicious attacks (e.g. brute force attacks) that can potentially expose locally stored keys used to sign authentication indications, even when hardware-based security mechanisms are available and used.

To address these and other shortcomings of previous technologies, a new technical solution is disclosed for securely asserting that a user device has successfully authenticated a current user of the user device. During operation of the disclosed technology, an authenticator process executing on processing circuitry of the user device, verifies that the current user of the user device is an authentic user by performing a user authentication operation. The user authentication operation compares a user-supplied credential received from the current user of the user device to a previously stored credential. The user of the user device is successfully authenticated by the authentication operation in response to the user-supplied credential matching the previously stored credential.

In response to the current user of the user device being successfully authenticated by the authentication operation, a digitally signed authentication assertion is generated by digitally signing a document using a signing key that is uniquely assigned to the authenticator process. The document includes an indication that the current user of the user device was successfully authenticated on the user device. The signing key uniquely assigned to the authenticator process is stored in a key container associated with the user device, and the key container is located on a key container server that is physically separate from the user device. The digitally signed authentication assertion is conveyed from the authenticator process to an authentication service, in order to securely indicate to the authentication service that the current user of the user device has been verified as an authentic user.

In another aspect of the disclosed technology, in response to the current user of the user device being successfully authenticated by the authentication operation, the authenticator process may transmit, from the user device to the key container server, a request for the signing key uniquely assigned to the authenticator process. In response to receipt of the request for the signing key uniquely assigned to the authenticator process, the key container server i) retrieves the signing key uniquely assigned to the authenticator process from the key container associated with the user device, and ii) transmits the signing key uniquely assigned to the authenticator process from the key container server to the user device. In response to receipt of the signing key uniquely assigned to the authenticator process, the authenticator process generates the digitally signed authentication assertion on the user device by digitally signing the document within the user device using the signing key uniquely assigned to the authenticator process and received from the key container server.

After the digitally signed authentication assertion has been generated on the user device, the authenticator process may destroy all copies of the signing key uniquely assigned to the authenticator process that are stored in the user device. For example, all copies of the signing key uniquely assigned to the authenticator process may be automatically destroyed i) immediately upon detecting that the digitally signed authentication assertion has been generated on the user device, ii) after expiration of a predetermined period of time following receipt of the signing key uniquely assigned to the authenticator process, or iii) upon detecting that a high risk event has occurred indicating a risk that the user device has been or will be compromised.

In another aspect of the disclosed technology, a request for the signing key uniquely assigned to the user device may include an identifier of the user device, and the key container server may retrieve the signing key uniquely assigned to the authenticator process by using the identifier of the user device to index into a key container database to retrieve the signing key uniquely assigned to the authenticator process from the key container associated with the user device.

In another aspect of the disclosed technology, the key container may store multiple signing keys uniquely associated with the authenticator process. Each one of the multiple signing keys uniquely associated with the authenticator process may also be uniquely associated with a different application or service. The request for the signing key uniquely assigned to the authenticator process may include an identifier of the user device and an identifier of an application or service that has requested that the authentication service authenticate the current user of the user device. The key container server may retrieve the signing key uniquely assigned to the authenticator process by using both the identifier of the user device and the identifier of the application or service that requested that the authentication service authenticate the current user of the user device to index into the key container database.

In another aspect of the disclosed technology, in response to the current user of the user device being successfully authenticated by the authentication operation, the authenticator process may transmit, from the user device to the key container server, a request for the key container server to generate the digitally signed authentication assertion. In response to receipt by the key container server of the request for the key container server to generate the digitally signed authentication assertion, the key container server i) retrieves, from the key container associated with the user device, the signing key uniquely assigned to the authenticator process, ii) generates the digitally signed authentication assertion by digitally signing the document using the signing key uniquely assigned to the authenticator process, and iii) transmits the digitally signed authentication assertion to the user device. The user device receives the digitally signed authentication assertion from the authentication server, and the authenticator process conveys the digitally signed authentication assertion to the authentication service by conveying the digitally signed authentication assertion that was received from the key container server to the authentication service. For example, the authenticator process may create the document that includes the indication that the current user of the user device was successfully authenticated on the user device, and the request for the key container server to generate the digitally signed authentication assertion may contain the document that includes the indication that the current user of the user device was successfully authenticated on the user device, to be digitally signed on the key container server.

A request for the key container server to generate the digitally signed authentication assertion may include an identifier of the user device, and the key container server may retrieve the signing key uniquely assigned to the authenticator process by using the identifier of the user device to index into a key container database to retrieve the signing key uniquely assigned to the authenticator process from the key container associated with the user device.

In an example in which the key container may store multiple signing keys uniquely associated with the authenticator process, and each one of the multiple signing keys uniquely associated with the authenticator process may also be uniquely associated with a different application or service, a request for the key container server to generate the digitally signed authentication assertion may include an identifier of the user device and an identifier of an application or service that has requested that the authentication service authenticate the current user of the user device, and the key container server may retrieve the signing key uniquely assigned to the authenticator process by using both the identifier of the user device and the identifier of the application or service that has requested that the authentication service authenticate the current user of the user device to index into the key container database.

A signing key uniquely assigned to the authenticator process may be generated by generating a public and private key-pair, in which the signing key uniquely assigned to the authenticator process is the private key of the public and private key-pair. After it is generated, the signing key uniquely assigned to the authenticator process may is stored into the key container associated with the user device, and the public key of the public and private key-pair may be conveyed to the authentication service.

The key container associated with the user device may store both a signing key uniquely assigned to the authenticator process and a previously stored credential that may be used to authenticate the current user of the user device during the authentication operation. The authentication operation may accordingly further include i) transmitting, by the authenticator process from the user device to the key container server, a request for the previously stored credential, and ii) receiving, from the key container server, the previously stored credential. For example, the user-supplied credential may be a password received from the current user through a graphical user interface, and the previously stored credential obtained from the remote key container may be a password associated with a user account to which the user has requested access, or the user-supplied credential may be biometric features extracted from a biometric sample obtained from the current user through a biometric sensor, and the previously stored credential obtained from the remote key container may be a biometric template associated with the user account.

Embodiments of the disclosed technology may solve significant problems inherent in previous technologies. For example, by using a key container located on a key container server to store one or more signing keys that are uniquely assigned to an authenticator process, and that are used to create digitally signed authentication assertions, and/or by generating digitally signed authentication assertions on the key container server, the disclosed technology provides security for the authentication assertion without relying on hardware-based security mechanisms contained in the user device. Accordingly, security of the authentication process is improved both for situations in which the user device does not include appropriate hardware-based security mechanisms, and/or situations in which hardware-based security mechanisms are included in the device, but the hardware based security mechanisms are not available to or accessible to an authenticator process that performs user authentication (e.g. because the authenticator process is not certified by the manufacturer of the user device and/or the manufacturer of the device's operating system).

In addition, the disclosed system may provide improved authentication security over solutions that employ hardware-based security mechanisms within the user device, since even hardware-based security mechanisms may be compromised in the case where a user device is lost or stolen, and then subjected to malicious attacks (e.g. brute force attacks) that can expose locally stored cryptographic keys of the device even when hardware-based security mechanisms are used.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
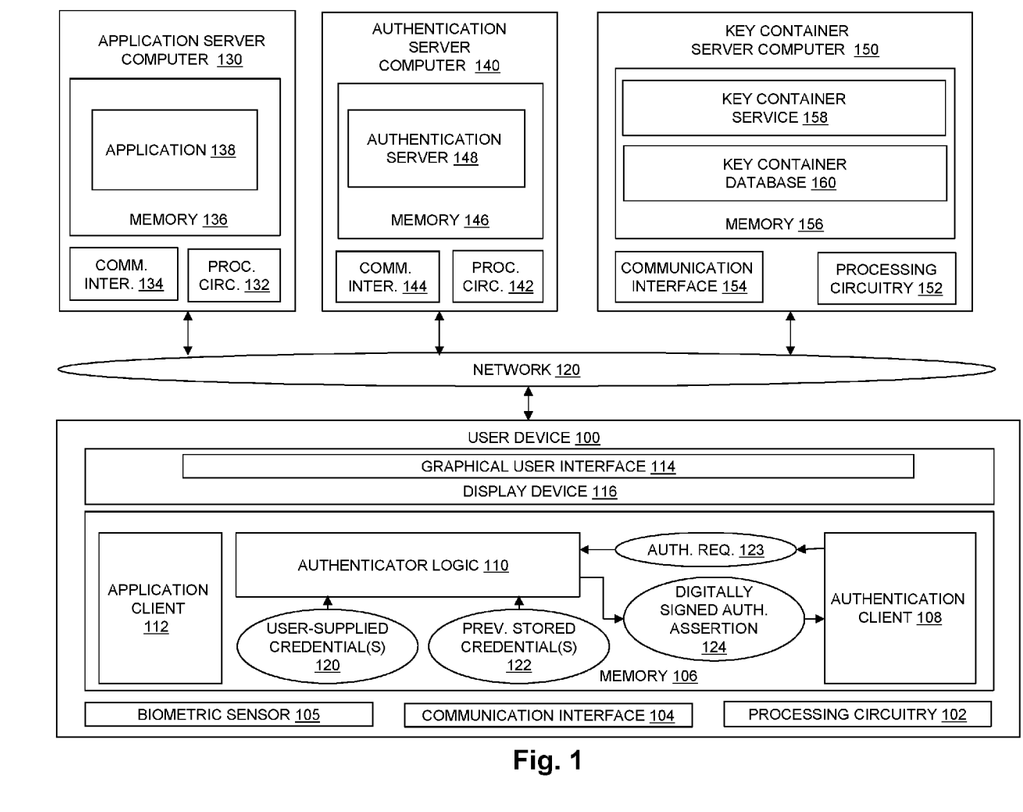
FIG. 1 is a block diagram showing an example of components in an illustrative embodiment of the disclosed system.

FIG. 1 is a block diagram showing an example of components in an illustrative embodiment of the disclosed system. FIG. 1 shows a User Device 100 having Processing Circuitry 102, Communication Interface 104, Biometric Sensor 105, Memory 106, and a Display Device 116. As also shown in FIG. 1, Application Server Computer 130 includes Processing Circuitry 132, Communication Interface 134, and Memory 136, Authentication Server Computer 140 includes Processing Circuitry 142, Communication Interface 144, and Memory 146, and Key Container Server Computer 150 includes Processing Circuitry 152, Communication Interface 154, and Memory 156.

Processing Circuitry 102, 132, 142, and 152 may, for example, each include or consist of one or more microprocessors or the like. Each one of Communication Interfaces 104, 134, 144, and 154 may, for example, include or consist of one or more network interface cards (NICs) or the like. And Memory 106, 136, 146 and 156 may each include or consist of any specific type of volatile or non-volatile semiconductor memory or the like that is operable to store programs (e.g. sequences of instructions) and/or data (e.g. program state information, input data, output data, etc.) for use in the respective one of User Device 100, Application Server Computer 130, Authentication Server Computer 140, and Key Container Server Computer 150. Display Device 116 may include or consist of any specific type of output device operable to present information in visual form, such as a computer monitor or other type of electronic visual display. Biometric Sensor 105 may consist of or include a digital camera operable to capture image data (e.g. one or more images of the user's face, fingerprint, eye or eye region, palm, etc.), a microphone operable to capture a recording of the user's voice, and/or any other specific type of biometric sensor operable to capture a biometric sample from a current user of User Device 100.

User Device 100 may consist of or include any specific type of computer or computer system, including but not limited to a computerized handheld device such as a smartphone or personal digital assistant, or a tablet computer, laptop computer, or desktop computer.

Each of Application Server Computer 130, Authentication Server Computer 140, and Key Container Server Computer 150 may be embodied to include or consist of one or more physical server computer systems, or alternatively as one or more virtual private servers (VPSs), such as one or more cloud servers or the like.

The Memory 106 of User Device 100 stores program code for execution on the Processing Circuitry 102, shown in the example of FIG. 1 by Authentication Client 108, Authenticator Logic 110, and Application Client 112. The Memory 136 of Application Server Computer 130 stores program code for execution on the Processing Circuitry 132, including one or more remotely hosted secure network resources, shown in the example of FIG. 1 by Application 138. Memory 146 of Authentication Server Computer 140 stores program code for execution on the Processing Circuitry 142, shown in the example of FIG. 1 by Authentication Server 108. And Memory 156 of Key Container Server Computer 150 stores program code for execution on the Processing Circuitry 152, shown in the example of FIG. 1 by Key Container Service 158. Memory 156 also contains a database of key containers, shown by Key Container Database 160.

Authentication Client 108 may include or consist of client software that is part of an authentication service that also includes the Authentication Server 148. Application Client 112 may, for example, be a user agent, such as a Web browser, through which the user of User Device 100 accesses one or more remotely hosted secure network resources, such as Application 138. Application 138 may be any specific type of secure network resource, such as a Web page, application or service, network service, etc., that requires user authentication, and that uses the authentication service provided at least in part by Authentication Server 148 and Authentication Client 108 in order to authenticate users. Authenticator Logic 110 is an example of an authenticator process that responds to authentication requests from Authentication Client 108 (e.g. Authentication Request 123), by authenticating a current user of User Device 100. In the example of FIG. 1, Authenticator Logic 110 authenticates a current user of User Device 100 by comparing a User-Supplied Credential 120 to a Previously Stored Credential 122. Key Container Service 158 is a service used by Authenticator Logic 110 to access the contents of a key container for User Device 110 located within Key Container Database 160. The contents of the key container for User Device 100 may be used by Authenticator Logic 110 to generate Digitally Signed Authentication Assertion 124 in response to the current user of User Device 100 being successfully authenticated, as further described below.

In addition, those skilled in the art will further recognize that while only certain examples of program code are shown in FIG. 1 for purposes of concise illustration and explanation with regard to each of User Device 100, Application Server Computer 130, Authentication Server Computer 140, and Key Container Server Computer 150, other specific program code or logic may also be present in each of Memory 106, Memory 136, Memory 146, and/or Memory 156. Such additional software may, for example, include operating system, middleware, and/or various specific types of application program code.

User Device 100, Application Server Computer 130, Authentication Server Computer 140, and Key Container Server Computer 150 may all be communicably interconnected by a Network 200 that is made up of one or more communication networks and/or computer networks that allow computers to exchange data. Such networks may, for example, include or consist of one or more Local Area Networks (LANs), Wireless Local Area Networks (WLANs), Wide Area Networks (WANs), e.g. the Internet, and/or any other specific type of network. Messages communicated over Network 120 may be embodied and exchanged based on one or more communication protocols including, but not limited to, Hypertext Transfer Protocol (HTTP), Transmission Control Protocol (TCP), Internet Protocol (IP), Ethernet, Wi-Fi, and/or any other specific communication protocol that may be appropriate for a particular network or embodiment. Secure communications over Network 200 may, for example, be provided using the Transport Layer Security (TLS) protocol or its predecessor the Secure Sockets Layer (SSL) protocol to establish one or more secure connections between the devices shown in FIG. 1 over Network 200.

Figure 2:
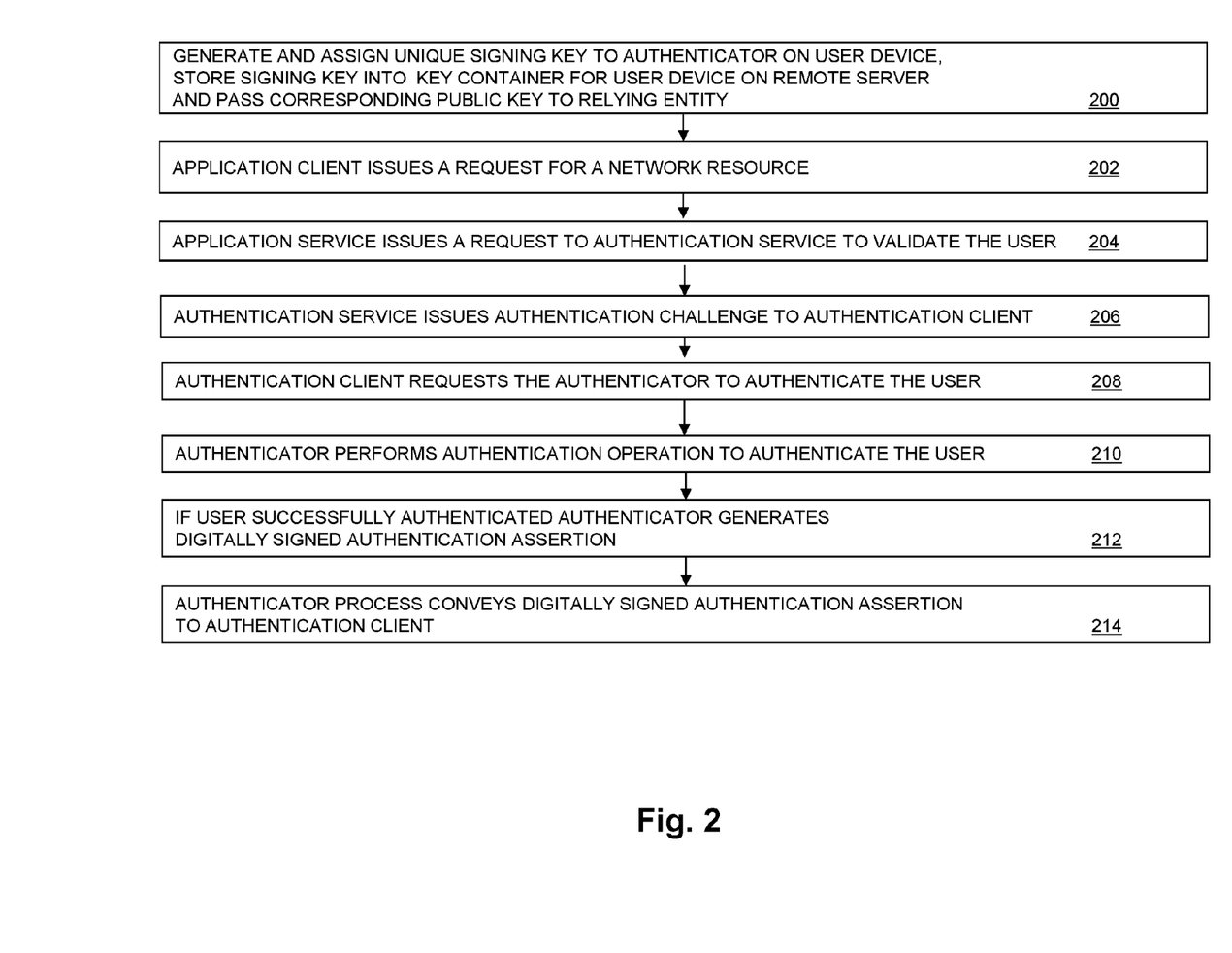
FIG. 2 is a flow chart showing an example of steps performed in an illustrative embodiment to securely assert that an authenticator process on a user device has successfully authenticated the current user of the user device.

FIG. 2 is a flow chart showing an example of steps performed by the devices shown in FIG. 1 to securely assert that User Device 100 has successfully authenticated the current user of User Device 100. At step 200, a unique signing key is generated and assigned to Authenticator Logic 110. For example, a signing key uniquely assigned to the Authenticator Logic 110 may be generated by generating a unique public and private key-pair for Authenticator Logic 110. The signing key uniquely assigned to Authenticator Logic 110 is then the private key of the unique public and private key-pair generated for Authenticator Logic 110. Generation of the public and private key-pair may, for example, be performed by program code using a random number generator or pseudo-random number generator, contained either in the User Device 100, or in the Key Container Server Computer 150. The signing key uniquely assigned to the Authenticator Logic 110 is stored into a key container associated with the User Device 100 and located remotely from User Device 100 in Key Container Database 160.

Further at step 200, the public key of the public and private key-pair generated for Authenticator Logic 110 may then be conveyed to an entity that will rely on digital signatures generated using the signing key uniquely assigned to the Authenticator Logic 110. For example, the public key of the public private key-pair generated for Authenticator Logic 110 may be transmitted or otherwise conveyed to the authentication service that includes Authentication Server 148 and Authentication Client 108. Subsequently, Authentication Client 108 and/or Authentication Server 148 can use the public key to verify that a digitally signed authentication assertion (e.g. Digitally Signed Authentication Assertion 124) was generated by Authenticator Logic 110, and has not been modified by a malicious entity. In another example, the public key of the public private key-pair may be transmitted or otherwise conveyed to a remotely hosted secure network resource, such as Application 138. In that case, Application 138 may subsequently use the public key to verify that a digitally signed authentication assertion (e.g. Digitally Signed Authentication Assertion 124) was generated by Authenticator Logic 110, and has not been modified by a malicious entity.

At step 202, Application Client 112 issues a request for a remotely hosted secure network resource network resource, shown in the example of FIG. 1 by Application 138. For example, Application Client 112 may issue a request for a remotely hosted secure network resource at step 202 by sending an HTTP GET command to Application 138, e.g. in order to retrieve a Web page of a Web site provided by Application 138. Application 138 requires user authentication for access to the requested Web page, and Application 138 uses an authentication service provided at least in part by Authentication Server 148 and Authentication Client 108 to perform user authentication. Accordingly, at step 204 Application 138 issues (e.g. transmits) a request to Authentication Server 148 to authenticate the current user of User Device 100.

At step 206, in response to the request issued from Application 138 at step 204, at step 206 Authentication Server 148 issues (e.g. transmits) an authentication challenge to Authentication Client 108, requesting that the current user of User Device 100 be authenticated by User Device 100. For example, the authentication challenge issued at step 206 may request that Authentication Client 108 verify that the current user of User Device 100 is an authentic user with regard to Application 138, e.g. is the authentic user for a previously established and currently active user account with Application 138 that permits access to the Web page requested at step 202.

In response to the authentication challenge issued at step 206, at step 208 Authentication Client 108 sends a request to Authenticator Logic 110, shown in FIG. 1 by Authentication Request 123. Authentication Request 123 from Authentication Client 108 requests that Authenticator Logic 110 authenticate the current user of User Device 100. Authentication Request 123 may, for example, consist of a message passed from Authentication Client 108 to an Authentication Logic 110 that is a separate and independently executing process. Such a message may be passed using inter-process message passing, e.g. passed by Authentication Client 108 to an Application Programming Interface (API) or the like provided by Authentication Logic 110. In this way, Authentication Client 108 and Authentication Logic 110 may be separate and independent application programs provided by different manufacturers. Alternatively, Authentication Logic 110 may be a module, component or object contained within Authentication Client 108, and Authentication Request 123 may consist of or include a call to a function or method provided by Authentication Logic 110.

In response to Authentication Request 123, at step 210 Authentication Logic 110 performs a user authentication operation to verify that the current user of User Device 100 is an authentic user. The user authentication operation performed at step 210 includes comparing at least one user-supplied credential received from the current user of the user device (e.g. User-Supplied Credential(s) 120) to one or more previously stored credentials (e.g. Previously Stored Credential(s) 122). The current user of User Device 100 is successfully authenticated by the authentication operation performed by Authenticator Logic 110 in response to the user-supplied credential matching the previously stored credential.

In general, any specific authentication technique may be used by Authenticator Logic 110 to authenticate the current user of User Device 100 at step 210, including authentication processes based on i) "knowledge" factors, consisting of something the user knows (e.g. a password, passphrase, personal identification number (PIN), answer to a security question, etc.), ii) "ownership" factors, consisting of something the user has (e.g. an ID card, security token, etc.), and/or "inherence" factors (e.g. fingerprint, retinal pattern, or other biometric identifier).

For example, User-Supplied Credential(s) 120 may consist of a password received from the current user of User Device 100, e.g. through Graphical User Interface 114 displayed on Display Device 116. Previously Stored Credential(s) 122 may consist of a password for a previously established and currently active user account with Application 138, that permits access to the Web page requested at step 202. In such a case, the current user of User Device 100 is successfully authenticated by the authentication operation performed by Authenticator Logic 110 in response to the password received from the current user of User Device 100 matching the password for the user account previously established with Application 138.

Alternatively, User-Supplied Credential(s) 120 may consist of a biometric sample, e.g. a set of biometric features extracted from a biometric sample captured from the current user of User Device 100 by Biometric Sensor 105, and Previously Stored Credential(s) 122 may consist of a biometric template for a user who is associated with a previously established and currently active user account with Application 138 that permits access to the Web page requested at step 202. In such a case, the current user of User Device 100 is successfully authenticated by the authentication operation performed by Authenticator Logic 110 in response to the biometric features extracted from the captured biometric sample matching the biometric template for the user associated with the user account previously established with Application 138.

In response to the current user of the User Device 100 being successfully authenticated by the authentication operation performed at step 210, at step 212 the Authenticator Logic 110 generates a digitally signed authentication assertion, shown by Digitally Signed Authentication Assertion 124. Digitally Signed Authentication Assertion 124 includes a document indicating that the current user of User Device 100 was successfully authenticated on User Device 100. Digitally Signed Authentication Assertion 124 is signed using the signing key that is uniquely assigned to the Authenticator Logic 110, and that was previously stored at step 200 in the key container corresponding to User Device 100 in Key Container Database 160, and located on the Key Container Server Computer 150.

For example, Digitally Signed Authentication Assertion 124 may be digitally signed using the private key of the public and private key-pair generated for Authenticator Logic 110 at step 200, and that was stored at step 200 into a key container corresponding to User Device 100 in the Key Container Database 160. In one example, the Digitally Signed Authentication Assertion 124 is generated at step 212 by first applying a hash function to the document indicating that the current user of User Device 100 was successfully authenticated. The result of applying the hash function to the document is a hash value for the document. The hash value for the document is then encrypted using the private key of the public and private key-pair generated for Authenticator Logic 110, that was previously stored in the key container corresponding to User Device 100 in Key Container Database 160. Finally, the encrypted hash value is attached to the document as a digital signature, resulting in the Digitally Signed Authentication Assertion 124.

The Digitally Signed Authentication Assertion 124 is then conveyed at step 214 from the Authenticator Logic 110 to an authentication service, e.g. the authentication service that includes Authentication Server 148 and Authentication Client 108. For example, Digitally Signed Authentication Assertion 124 may be passed from Authenticator Logic 110 to Authentication Client 106 through inter-process message passing, e.g. passed by Authenticator Logic 110 to Authentication Client 106 through an Application Programming Interface (API) or the like provided by Authentication Logic 110. Alternatively, in an embodiment in which Authentication Logic 110 is a module, component or object contained within Authentication Client 108, Digitally Signed Authentication Assertion 124 may simply be transmitted from Authentication Client 106 to Authentication Server 148.

In this way, Authenticator Logic 110 securely indicates to the authentication service that includes Authentication Server 148 and Authentication Client 108 that the current user of the User Device 100 has been verified as an authentic user by Authenticator Logic 110. Any holder of the public key of the public and private key-pair generated for Authenticator Logic 110 can then verify that Digitally Signed Authentication Assertion 124 was generated by Authenticator Logic 110, and has not been modified by a malicious entity. For example, such verification may be performed by Authentication Client 106, or by Authentication Server 148 after Authentication Client 106 transmits Digitally Signed Authentication Assertion 124 to the Authentication Server Computer 140. In another example, Digitally Signed Authentication Assertion 124 may be passed from Authentication Server 148 to Application 138, and Application 138 may use a copy of the public key of the public and private key-pair generated for Authenticator Logic 110 to verify that Digitally Signed Authentication Assertion 124 was generated by Authenticator Logic 110, and has not been modified by a malicious entity. Specifically, when the Digitally Signed Authentication Assertion 124 is received by an entity having a copy of the public key of the public and private key-pair generated for Authenticator Logic 110 (e.g. Authentication Client 106, Authentication Server 148, or Application 138), the receiving entity uses the same hash function as used when generating the digital signature for Digitally Signed Authentication Assertion 124, to calculate the hash value of the document contained in the Digitally Signed Authentication Assertion 124. The public key is then used to decrypt the digital signature contained in Digitally Signed Authentication Assertion 124, and the decrypted value is compared to the calculated hash value. If there is a match, then the receiving entity has confirmed that Digitally Signed Authentication Assertion 124 was generated by Authenticator Logic 110, and has not been modified by a malicious entity.

Figure 3:
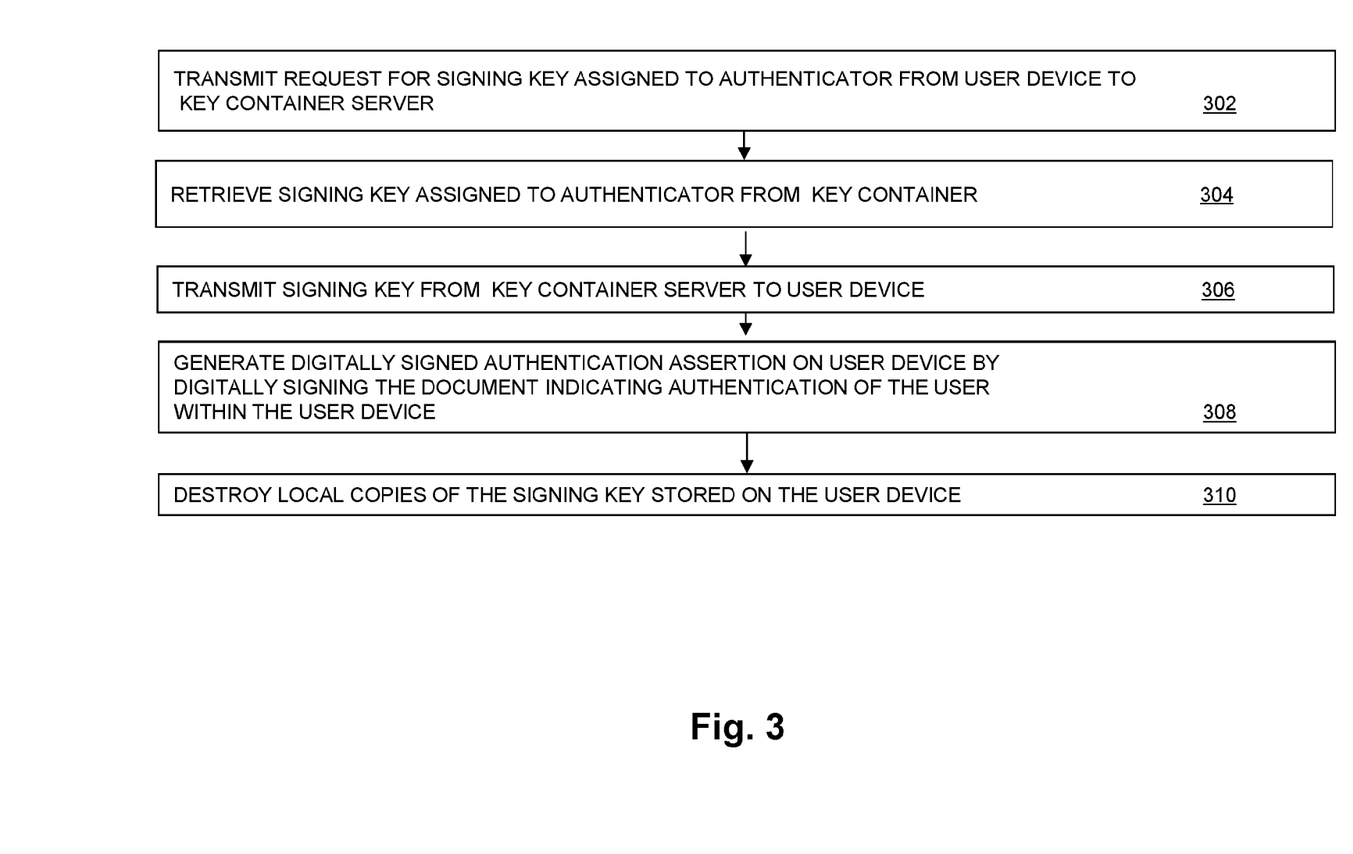
FIG. 3 is a flow chart showing an example of steps performed in an illustrative embodiment to request, by the user device from a key container service, a signing key assigned to an authenticator process of the user device, and to use the received signing key within the user device to generate a digitally signed authentication assertion by digitally signing a document indicating that that the current user of the user device has been successfully authenticated.

FIG. 3 is a flow chart showing an example of steps performed to request a signing key uniquely assigned to Authenticator Logic 110 from the Key Container Service 158, and to use the signing key received from Key Container Service 158 within the User Device 100 to generate Digitally Signed Authentication Assertion 124 by digitally signing a document indicating that the current user of User Device 100 has been successfully authenticated on the User Device 100 (e.g. by Authenticator Logic 110).

At step 302, in response to the current user of the User Device 100 being successfully authenticated by the authentication operation performed in step 210 of FIG. 2, the Authenticator Logic 110 transmits, to Key Container Server Computer 150, a request for a signing key uniquely assigned to the Authenticator Logic 110 (e.g. a request for the private key of the public private key-pair generated for Authenticator Logic 110).

At step 304, in response to receipt by the Key Container Server Computer 150 of the request for the signing key uniquely assigned to the Authenticator Logic 110, Key Container Service 158 retrieves the signing key uniquely assigned to Authenticator Logic 110 from a key container associated with User Device 100 and located in Key Container Database 160. At step 306 Key Container Service 158 transmits the signing key uniquely assigned to the Authenticator Logic 110 from the Key Container Server Computer 150 to the User Device 100.

At step 308, in response to receipt by User Device 100 of the signing key uniquely assigned to the Authenticator Logic 110, the Authenticator Logic 110 generates Digitally Signed Authentication Assertion 124 within User Device 100 by digitally signing the document indicating that the current user of User Device 100 was successfully authenticated on User Device 100, using the signing key uniquely assigned to the Authenticator Logic 110.

At step 310, in order to maintain the security of the signing key uniquely assigned to the Authenticator Logic 110, Authenticator Logic 110 destroys all copies of the signing key uniquely assigned to Authenticator Logic 110 that are stored in User Device 100. For example, Authenticator Logic 110 may destroy (e.g. delete from memory and/or other data storage within User Device 100) all copies of the signing key uniquely assigned to Authenticator Logic 110 that are stored in User Device 100 immediately upon detecting that the Digitally Signed Authentication Assertion 124 has been generated on User Device 100. In another example, Authenticator Logic 110 may destroy (e.g. delete from memory or other data storage within User Device 100) all copies of the signing key uniquely assigned to Authenticator Logic 110 that are stored in User Device 100 immediately upon detecting that a predetermined period of time has expired (e.g. some number of hours, days, etc., depending on system configuration) following receipt, by the User Device 100, of the signing key uniquely assigned to the Authenticator Logic 110. In another example, Authenticator Logic 110 may destroy (e.g. delete from memory or other data storage within User Device 100) all copies of the signing key uniquely assigned to Authenticator Logic 110 that are stored in User Device 100 at step 310 immediately upon detecting that a high risk event has occurred on the User Device 100 following receipt, by the User Device 100, of the signing key uniquely assigned to the Authenticator Logic 110. For example, in the event that User Device 100 is reported lost or stolen (e.g. to Authentication Server 148 or to some other security-related service), a message may be sent to Authenticator Logic 110 (e.g. from Authentication Client 108 or some other software executing on User Device 100) indicating that User Device 100 has been lost or stolen. Receipt of the message indicating that User Device 100 has been lost or stolen is an example of detecting that a high risk event has occurred on User Device 100, indicating a significant security risk with regard to User Device 100, and causes Authenticator Logic 110 to immediately destroy all copies of the signing key uniquely assigned to Authenticator Logic 110 that are stored in User Device 100.

The request transmitted at step 302, for the signing key uniquely assigned to the Authenticator Logic 110, may include an identifier of the User Device 100, such as a device name, device IP (Internet Protocol) or MAC (Media Access Control) address, etc. At step 304 the Key Container Service 158 may retrieve the signing key uniquely assigned to Authenticator Logic 110 by using the identifier of the User Device 100 contained in the request transmitted at step 302 to index into Key Container Database 160 to retrieve the signing key uniquely assigned to the Authenticator Logic 110 from a key container corresponding to User Device 100 and associated with the identifier of the User Device 100.

In one configuration, Key Container Database 160 may contain a key container for each one of multiple user devices. A key container for an individual user device may store multiple signing keys that are each uniquely assigned to the authenticator process executing on that user device. For example, the key container corresponding to User Device 100 may store multiple signing keys uniquely assigned to Authenticator Logic 110, where each one of the multiple signing keys is also uniquely associated with a different application or service. Accordingly, in such a configuration of the disclosed system, while one of the multiple signing keys uniquely assigned to Authenticator Logic 110 is also uniquely associated with Application 138, each other one of the signing keys uniquely assigned to Authenticator Logic 110 is uniquely associated with a different application or service. In such a configuration, a public and private key-pair may be generated for each one of multiple applications or services with which the user of User Device 100 has registered and created a user account. The private key of each key-pair is stored in the key container in Key Container Database 160, and the corresponding public key is conveyed to the corresponding application or service. The request transmitted at step 302 for the signing key uniquely assigned to Authenticator Logic 110 may accordingly include both an identifier of User Device 100, and an identifier of the specific application or service (e.g. Application 138) that has requested that the authentication service (e.g. the authentication service that includes Authentication Server 148 and Authentication Client 108) authenticate the current user of the User Device 100. At step 304, the Key Container Service 158 may then retrieve the appropriate one of the signing keys uniquely assigned Authenticator Logic 110 by indexing into the Key Container Database 160 using both i) the identifier of the User Device 100 and ii) the identifier of the application or service (e.g. Application 138) that requested that the authentication service authenticate the current user of the User Device 100.

Figure 4:
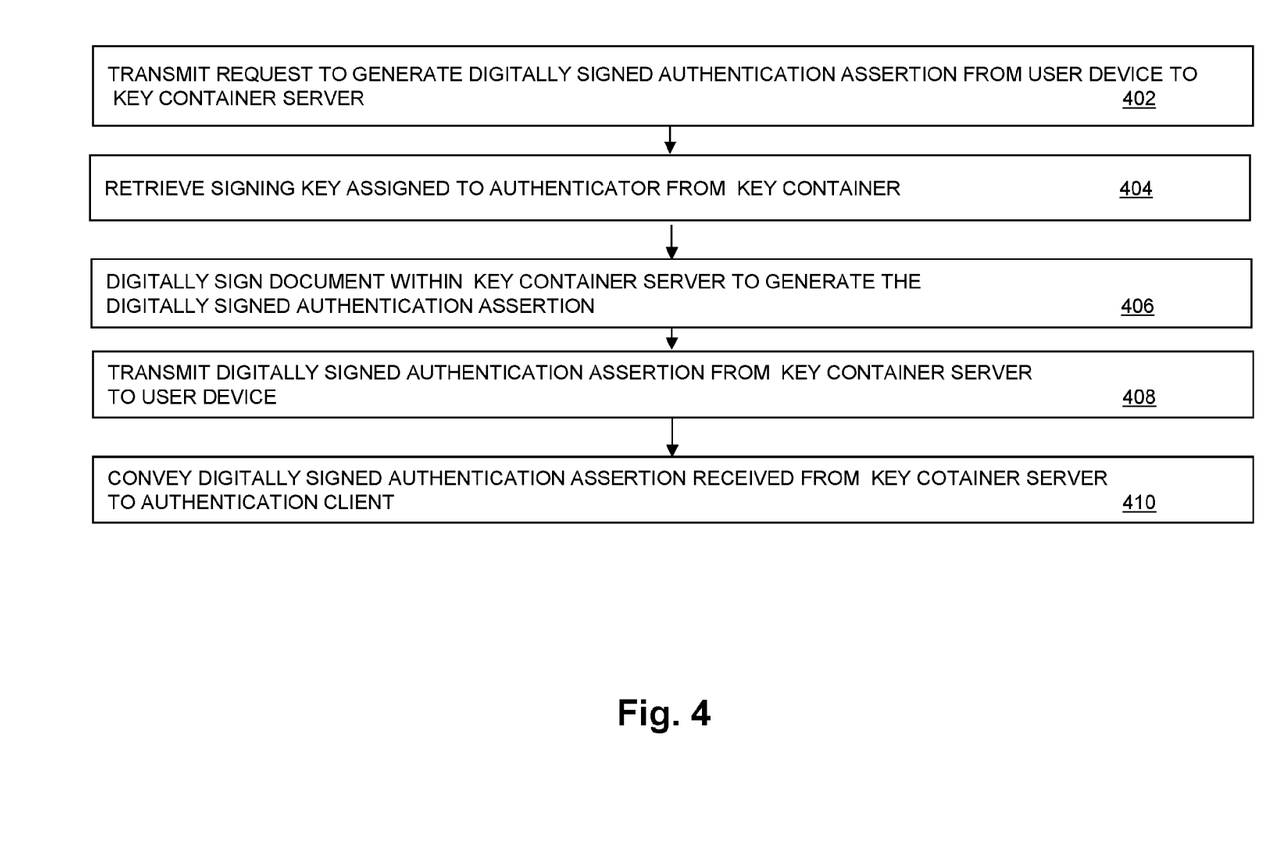
FIG. 4 is a flow chart showing an example of steps performed in an illustrative embodiment to request that a key container service generate a digitally signed authentication assertion using a signing key assigned to an authenticator process of a user device, and to transmit the digitally signed authentication assertion to the user device so that the authenticator process can securely assert that the current user of the user device has been successfully authenticated.

FIG. 4 is a flow chart showing an example of steps performed by the devices shown in FIG. 1 to issue a request that Key Container Service 158 generate Digitally Signed Authentication Assertion 124 on Key Container Server Computer 150 using a signing key uniquely assigned to Authenticator Logic 110, and to transmit the Digitally Signed Authentication Assertion 124 from Key Container Server Computer 150 to the User Device 100 so that Authenticator Logic 110 can securely assert that the current user of the User Device 100 has been successfully authenticated on the User Device 100 (e.g. by Authenticator Logic 110) using Digitally Signed Authentication Assertion 124.

At step 402, in response to the current user of User Device 100 being successfully authenticated by the authentication operation performed in step 210 of FIG. 2, the Authenticator Logic 110 transmits, to Key Container Server Computer 150, a request for Key Container Service 158 to generate the Digitally Signed Authentication Assertion 124.

At step 404, in response to receipt by the Key Container Server Computer 150 of the request for Key Container Service 158 to generate the Digitally Signed Authentication Assertion 124, the Key Container Service 158 retrieves a signing key uniquely assigned to the Authenticator Logic 110 from the key container corresponding to User Device 100 in Key Container Database 160. At step 406, the Key Container Service 158 generates the Digitally Signed Authentication Assertion 124 on the Key Container Server Computer 150 by digitally signing the document indicating successful authentication of the current user of User Device 100 using the signing key uniquely assigned to the Authenticator Logic 110.

At step 408 the Digitally Signed Authentication Assertion 124 is conveyed (e.g. transmitted) from the Key Container Server Computer 150 to the User Device 100, and at step 410 Authentication Logic 110 conveys the Digitally Signed Authentication Assertion 124 received from Key Container Computer 150 to the authentication service, e.g. by passing Digitally Signed Authentication Assertion 124 to Authentication Client 108.

In one example, the Authenticator Logic 110 may create the document that includes the indication that the current user of the User Device 100 was successfully authenticated on the User Device 100, and the request transmitted at step 402 for the Key Container Service 158 to generate the Digitally Signed Authentication Assertion 124 contains the document that includes the indication that the current user of the User Device 100 was successfully authenticated on the User Device 100.

The request transmitted at step 402 for the Key Container Service 158 to generate the Digitally Signed Authentication Assertion 124, may include an identifier of the User Device 100, such as a device name, device IP (Internet Protocol) or MAC (Media Access Control) address, etc. At step 404 the Key Container Service 158 executing on Key Container Server Computer 150 may retrieve the signing key uniquely assigned to Authenticator Logic 110 by using the identifier of the User Device 100 contained in the request to index into Key Container Database 160 to retrieve the signing key uniquely assigned to the Authenticator Logic 110 from a key container corresponding to User Device 100 and associated with the identifier of the User Device 100.

As described above, the key container for User Device 100 may store multiple signing keys uniquely assigned to Authenticator Logic 110, where each one of the multiple signing keys is also uniquely associated with a different application or service. The request for the Key Container Service 158 to generate the Digitally Signed Authentication Assertion 124 transmitted at step 402 may accordingly include both an identifier of User Device 100, and an identifier of the specific application or service that has requested that the authentication service (e.g. the authentication service that includes Authentication Server 148 and Authentication Client 108) authenticate the current user of the User Device 100. At step 404, the Key Container Service 158 retrieves the appropriate one of the signing keys uniquely assigned Authenticator Logic 110 by indexing into Key Container Database 160 using both i) the identifier of the User Device 100 and ii) the identifier of the application or service that requested that the authentication service authenticate the current user of the User Device 100.

Figure 5:
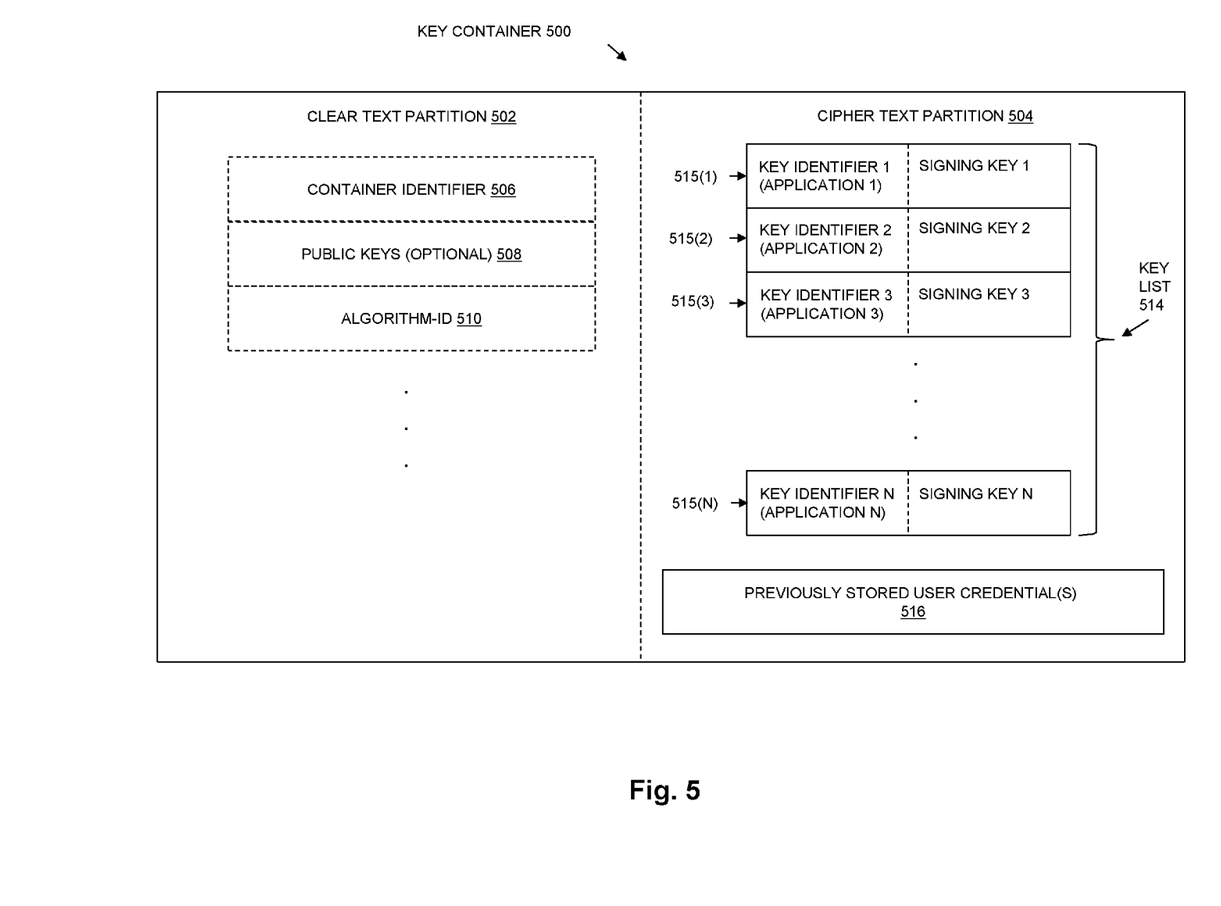
FIG. 5 is a block diagram showing an example of a key container in an illustrative embodiment.

FIG. 5 is a block diagram showing an example of a key container in an illustrative embodiment. The Key Container 500 shown in FIG. 5 is an example of one of multiple key containers that may be stored in the Key Container Database 160 shown in FIG. 1. Each of the key containers stored in Key Container Database 160 corresponds to a user device. For example, the Key Container 500 shown in FIG. 5 corresponds to User Device 100 shown in FIG. 1.

As shown in FIG. 5, Key Container 500 includes a Clear Text Partition 502 and a Cipher Text Partition 504. Clear Text Partition 502 includes un-encrypted data, including a Container Identifier 506, optional Public Keys 508, and an encryption algorithm identifier shown by Algorithm-ID 510. The Container Identifier 506 stores an identifier of the user device corresponding to the Key Container 500. In the example of FIG. 5, in which Key Container 500 corresponds to User Device 100, Container Identifier 506 stores a device identifier (e.g. device name, device IP (Internet Protocol) or MAC (Media Access Control) address, etc.) that uniquely identifies User Device 100 within Key Container Database 160, and accordingly that may be used to index into Key Container Database 160 in order to retrieve any of the contents of Key Container 500.

The optional Public Keys 508 may store any public keys relevant to operation of the disclosed system with regard to User Device 100, such as, for example, any public keys used to establish and maintain a secure communication channel between Key Container Service 158 and Authenticator Logic 110 (e.g. using TLS, SSL, etc.).

Algorithm-ID 510 stores an identifier of an encryption algorithm used to encrypt the Cipher Text Partition 504. The encryption algorithm identified by Algorithm-ID 510 is used by Key Container Service 158 to decrypt the contents of Cipher Text Partition 504 as needed to process requests received from Authentication Logic 110. Any specific encryption algorithm may be used in this regard, such as, for example, the symmetric-key encryption algorithm set forth in the Advanced Encryption Standard (AES) specification for the encryption of electronic data established by the U.S. National Institute of Standards and Technology (NIST).

Key List 514 includes one or more signing keys uniquely assigned to Authenticator Logic 110. In one example, a single signing key is assigned to Authenticator Logic 110, and Digitally Signed Authentication Assertion 124 is always digitally signed using the same signing key regardless of the application or service that requested authentication of the current user of User Device 100. In such an example, the single signing key assigned to Authenticator Logic 110 may be retrieved from Key Container Database 160 using only the device identifier for User Device 100 to index into Key Container Database 160 to obtain Key Container 500.

In another example, and as shown in FIG. 5, multiple signing keys that are all uniquely assigned to Authenticator Logic 110 may be stored in a list, shown in FIG. 5 by the multiple signing keys in Key List 514. In the example of FIG. 5, Key List 514 includes multiple entries shown as entry 515(1), entry 515(2), and entry 515(3), through entry 515(N). Each one of the entries 515 is uniquely associated with (e.g. contains) a signing key identifier. Specifically, entry 515(1) is uniquely associated with a Key Identifier 1, entry 515(2) is uniquely associated with a Key Identifier 2, and so on. Each of the entries 515 also contains one of the multiple signing keys uniquely assigned to Authenticator Logic 110. Accordingly, in order to retrieve a specific one of the signing keys assigned to Authenticator Logic 110, a device identifier for User Device 100 is used to index into Key Container Database 160 in order to retrieve the contents of Key Container 500, and additionally one of the key identifiers uniquely identifying a specific one of the entries 515 is used to index into the Key List 514.

For example, each of the entries 515 in Key List 514 may be uniquely associated with an application or service, and accordingly each of the key identifiers may be an identifier of the application or service with which the signing key for that entry is associated. Each one of the entries 515 may be added to Key List 514 when the user of User Device 100 establishes an account with a new application or service. Accordingly, Key Identifier 1 is a name or other identifier of a first application or service ("Application 1") with which the user of User Device 100 has an account, Key Identifier 2 is a name or other identifier of a second application or service ("Application 2") with which the user of User Device 100 has an account, Key Identifier 3 is a name or other identifier of a third application or service ("Application 3") with which the user of User Device 100 has an account, and so on through Key Identifier N, which is a name or other identifier of an Nth application or service ("Application N") with which the user of User Device 100 has an account. In order to retrieve a specific one of the signing keys assigned to Authenticator Logic 110 (e.g. one of the signing keys shown as Signing Key 1, Signing Key 2, Signing Key 3, through Signing Key N), in addition to using a device identifier for User Device 100 to index into Key Container Database 160 in order to retrieve the contents of Key Container 500, the Key Container Service 158 may use an identifier of the application or service that requested the authentication service to authenticate the user of User Device 100 to index into the Key List 514.

In the case where User Device 100 is a single user device, only one key list is needed. In the case where User Device 100 is a multi-user device, a separate key list Key Container 500 may be provided for each of the multiple users of User Device 100, and a user identifier of the current user of User Device 100 may be used to find the appropriate key list when indexing into Key Container Database 160 to obtain the appropriate one of the signing keys uniquely assigned to Authenticator Logic 110.

As further shown in FIG. 5, the Key Container 500 associated with User Device 100 may store, in addition to one or more signing keys uniquely assigned to Authenticator Logic 110, one or more previously stored user credentials, shown in the example of FIG. 5 by Previously Stored User Credential(s) 516. Previously Stored User Credential(s) 516 may include user credentials associated with one or more application or services with which a user of User Device 100 has an account, and may also be organized in a list having multiple entries, with each list entry corresponding to one of the applications with which the user of User Device 100 has an account, and containing a previously stored credential that must be matched by a user-supplied credential in order for the current user of User Device 100 to be authenticated.

Specifically, Previously Stored User Credential(s) 516 may include the Previously Stored Credential(s) 122 shown in FIG. 1, and associated with Application 138. The authentication operation performed in step 210 of FIG. 2 may include the Authenticator Logic 110 transmitting, from the User Device 100 to the Key Container Server Computer 150, a request for Previously Stored Credential(s) 122, and receiving Previously Stored Credential(s) 122 from the Key Container Server Computer 150. The Previously Stored Credential(s) 122 received from Key Container Server Computer 150 may then be compared with the User-Supplied Credential(s) 120 during the authentication operation performed at step 210 of FIG. 2.

Figure 6:
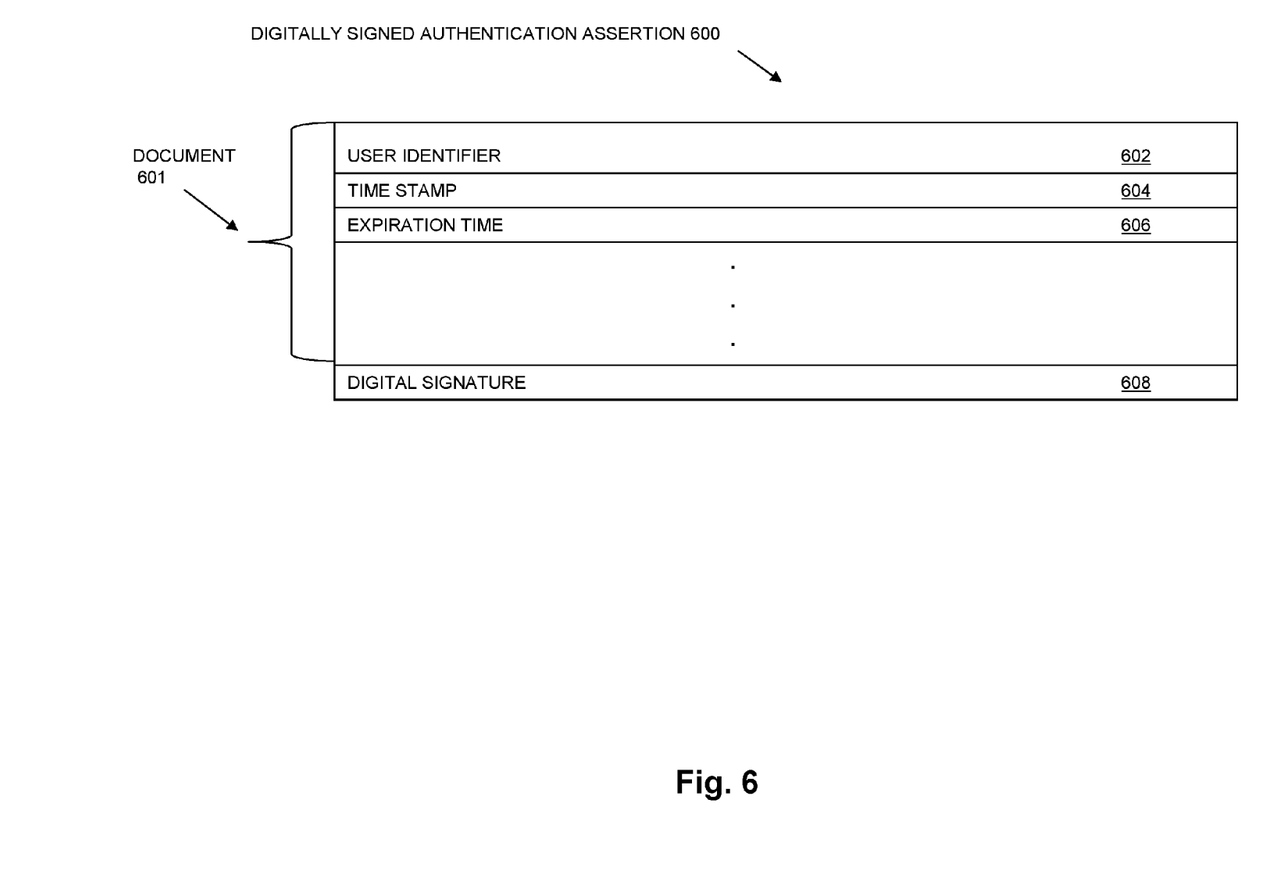
FIG. 6 is a block diagram showing an example of a digitally signed authentication assertion in an illustrative embodiment.

FIG. 6 is a block diagram showing Digitally Signed Authentication Assertion 600, which is an example of the Digitally Signed Authentication Assertion 124 shown in FIG. 1. As shown in FIG. 6, Digitally Signed Authentication Assertion 600 includes a Document 601, which is an example of a document that includes an indication that a current user of User Device 100 has been successfully authenticated. The indication that a current user of User Device 100 has been successfully authenticated is shown in FIG. 6 as including a User Identifier 602 that identifies the current user of User Device 100, a Time Stamp 604, and an Expiration Time 606. User Identifier 602 is an identifier uniquely associated with the current user of User Device 100, such as a username of the current user of User Device 100. Time Stamp 604 is a time stamp indicating the time at which the current user of User Device 100 was successfully authenticated. Expiration Time 606 is a time at which the authentication represented by Digitally Signed Authentication Assertion 600 expires, and at which the current user of User Device 100 must accordingly be re-authenticated. Digital Signature 606 is a digital signature generated by applying a hash function to Document 601 and encrypting the resulting hash value using a signing key uniquely assigned to the Authenticator Logic 110.

Based on the descriptions herein, those skilled in the art will recognize that embodiments of the disclosed technologies may solve significant problems inherent in previous technologies. For example, by using a key container located on Key Container Server Computer 150 to store one or more signing keys that are used to create one or more digitally signed authentication assertions (e.g. Digitally Signed Authentication Assertion 124), and/or by generating one or more digitally signed authentication assertions on the Key Container Server Computer 150, the disclosed technology provides security for authentication assertions without requiring the use of hardware-based security mechanisms contained in the user device. Accordingly, the disclosed system may provide improved security of the authentication process when the user device does not include appropriate hardware-based security mechanisms, and/or when hardware-based security mechanisms are included in the user device, but the hardware based security mechanisms are not available to or accessible by an authenticator process that performs user authentication. The disclosed system may also provide improved authentication security over previous systems that use hardware-based security mechanisms within the user device, since even hardware-based security mechanisms may be compromised in the case where a user device is lost or stolen, and then subjected to malicious attacks that can overcome hardware-based security mechanisms.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of securely asserting that a user device has successfully authenticated a current user of the user device, comprising:

performing a user authentication operation, by an authenticator process executing on processing circuitry of the user device, to verify that the current user of the user device is an authentic user, wherein the user authentication operation compares at least one user-supplied credential received from the current user of the user device to a previously stored credential, and wherein the user of the user device is successfully authenticated by the authentication operation in response to the user-supplied credential matching the previously stored credential;

in response to the current user of the user device being successfully authenticated by the authentication operation, transmitting, by the authenticator process from the user device to a key container server that is physically separate from the user device, a request for a signing key uniquely assigned to the authenticator process, wherein receipt by the key container server of the request for the signing key uniquely assigned to the authenticator process causes the key container server to i) retrieve the signing key uniquely assigned to the authenticator process from a key container associated with the user device, and ii) transmit the signing key uniquely assigned to the authenticator process from the key container server to the user device, wherein the key container stores a plurality of signing keys uniquely assigned to the authenticator process, each one of the plurality of signing keys uniquely assigned to the authenticator process also uniquely associated with a different application or service, wherein the request for the signing key uniquely assigned to the authenticator process includes an identifier of the user device and an identifier of an application or service that has requested that the authentication service authenticate the current user of the user device, and wherein the key container server retrieves the signing key uniquely assigned to the authenticator process by using the identifier of the user device and the identifier of the application or service that has requested that the authentication service authenticate the current user of the user device to index into a key container database, and automatically generating, by the authenticator process within the user device further in response to receipt by the user device of the signing key uniquely assigned to the authenticator process, a digitally signed authentication assertion, the digitally signed authentication assertion including a document that is digitally signed by the authenticator process using the signing key that is uniquely assigned to the authenticator process, wherein the document includes an indication that the current user of the user device was successfully authenticated on the user device; and conveying the digitally signed authentication assertion from the authenticator process to an authentication service, in order to securely indicate to the authentication service that the current user of the user device has been verified as an authentic user by the authenticator process.

2. The method of claim 1, further comprising:

detecting that the digitally signed authentication assertion has been generated on the user device; and destroying all copies of the signing key uniquely assigned to the authenticator process that are stored in the user device in response to detecting that the digitally signed authentication assertion has been generated on the user device.

3. The method of claim 1, further comprising:
  detecting that a predetermined period of time has expired following receipt, by the user device, of the signing key uniquely assigned to the authenticator process; and
  destroying all copies of the signing key uniquely assigned to the authenticator process that are stored in the user device in response to detecting that the predetermined period of time has expired following receipt, by the user device, of the signing key uniquely assigned to the authenticator process.

4. The method of claim 1, further comprising:
  detecting that a high risk event has occurred on the user device following receipt, by the user device, of the signing key uniquely assigned to the authenticator process; and
  destroying all copies of the signing key uniquely assigned to the authenticator process that are stored in the user device in response to detecting that the high risk event has occurred on the user device, wherein the high risk event indicates a significant security risk with regard to the user device.

5. The method of claim 1, further comprising:
  generating the signing key uniquely assigned to the authenticator process by generating a public and private key-pair, wherein the signing key uniquely assigned to the authenticator process comprises the private key of the public and private key-pair;
  storing the signing key uniquely assigned to the authenticator process into the key container associated with the user device; and
  conveying the public key of the public and private key-pair to the authentication service.

6. The method of claim 1, wherein the key container associated with the user device stores both the signing key uniquely assigned to the authenticator process and the previously stored credential, and wherein performing the authentication operation includes:
  transmitting, by the authenticator process from the user device to the key container server, a request for the previously stored credential; and
  receiving, from the key container server, the previously stored credential.

7. The method of claim 6, wherein the previously stored credential comprises a previously stored password and wherein the user-supplied credential comprises a user-supplied password; and
  wherein the user authentication operation compares the user-supplied password to the previously stored password.

8. The method of claim 6, wherein the previously stored credential comprises a previously stored biometric template and the user-supplied credential comprises a user-supplied biometric sample; and
  wherein the user authentication operation compares the user-supplied biometric sample to the previously stored biometric template.

9. A computer-implemented method of securely asserting that a user device has successfully authenticated a current user of the user device, comprising:
  performing a user authentication operation, by an authenticator process executing on processing circuitry of the user device, to verify that the current user of the user device is an authentic user, wherein the user authentication operation compares at least one user-supplied credential received from the current user of the user device to a previously stored credential, and wherein the user of the user device is successfully authenticated by the authentication operation in response to the user-supplied credential matching the previously stored credential;
  in response to the current user of the user device being successfully authenticated by the authentication operation, automatically generating, by the authenticator process, a digitally signed authentication assertion, the digitally signed authentication assertion including a document that is digitally signed using a signing key that is uniquely assigned to the authenticator process, wherein the document includes an indication that the current user of the user device was successfully authenticated on the user device, and wherein the signing key uniquely assigned to the authenticator process is stored in a key container associated with the user device and located on a key container server that is physically separate from the user device;
  conveying the digitally signed authentication assertion from the authenticator process to an authentication service, in order to securely indicate to the authentication service that the current user of the user device has been verified as an authentic user by the authenticator process;
  further in response to the current user of the user device being successfully authenticated by the authentication operation, transmitting, by the authenticator process from the user device to the key container server, a request for the key container server to generate the digitally signed authentication assertion;
  in response to receipt by the key container server of the request for the key container server to generate the digitally signed authentication assertion, the key container server i) retrieving the signing key uniquely assigned to the authenticator process from the key container associated with the user device, ii) digitally signing the document, in the key container server using the signing key uniquely assigned to the authenticator process, to generate the digitally signed authentication assertion, and iii) transmitting the digitally signed authentication assertion to the user device; and
  receiving the digitally signed authentication assertion by the user device, and wherein conveying the digitally signed authentication assertion from the authenticator process to the authentication service comprises conveying the received digitally signed authentication assertion from the authenticator process to the authentication service.

10. The method of claim 9, further comprising:
  creating, by the authenticator process, the document that includes the indication that the current user of the user device was successfully authenticated on the user device; and
  wherein the request for the key container server to generate the digitally signed authentication assertion contains the document that includes the indication that the current user of the user device was successfully authenticated on the user device.

11. The method of claim 10, wherein the request for the key container server to generate the digitally signed authentication assertion includes an identifier of the user device; and
  wherein the key container server retrieves the signing key uniquely assigned to the authenticator process by using the identifier of the user device to index into a key container database to retrieve the signing key uniquely assigned to the authenticator process from the key container associated with the user device.

12. The method of claim 10, wherein the key container stores a plurality of signing keys uniquely associated with the authenticator process, each one of the plurality of signing keys uniquely associated with the authenticator process also uniquely associated with a different application or service;
   wherein the request for the key container server to generate the digitally signed authentication assertion includes an identifier of the user device and an identifier of an application or service that has requested that the authentication service authenticate the current user of the user device; and
   wherein the key container server retrieves the signing key uniquely assigned to the authenticator process by using the identifier of the user device and the identifier of the application or service that has requested that the authentication service authenticate the current user of the user device to index into a key container database.

13. A user device, comprising:
processing circuitry; and
memory communicably coupled to the processing circuitry, the memory storing program code for securely asserting that a user device has successfully authenticated a current user of the user device, wherein the program code, when executed by the processing circuitry, causes the processing circuitry to:
   perform a user authentication operation, by an authenticator process executing on the processing circuitry, to verify that the current user of the user device is an authentic user, wherein the user authentication operation compares at least one user-supplied credential received from the current user of the user device to a previously stored credential, and wherein the user of the user device is successfully authenticated by the authentication operation in response to the user-supplied credential matching the previously stored credential,
   in response to the current user of the user device being successfully authenticated by the authentication operation:
      transmit, by the authenticator process from the user device to a key container server that is physically separate from the user device, a request for a signing key uniquely assigned to the authenticator process, wherein receipt by the key container server of the request for the signing key uniquely assigned to the authenticator process causes the key container server to i) retrieve the signing key uniquely assigned to the authenticator process from a key container associated with the user device, and ii) transmit the signing key uniquely assigned to the authenticator process from the key container server to the user device, wherein the key container stores a plurality of signing keys uniquely assigned to the authenticator process, each one of the plurality of signing keys uniquely assigned to the authenticator process also uniquely associated with a different application or service, wherein the request for the signing key uniquely assigned to the authenticator process includes an identifier of the user device and an identifier of an application or service that has requested that the authentication service authenticate the current user of the user device, and wherein the key container server retrieves the signing key uniquely assigned to the authenticator process by using the identifier of the user device and the identifier of the application or service that has requested that the authentication service authenticate the current user of the user device to index into a key container database, and
      automatically generate, by the authenticator process within the user device further in response to receipt by the user device of the signing key uniquely assigned to the authenticator process, a digitally signed authentication assertion, the digitally signed authentication assertion including a document that is digitally signed by the authenticator process using the signing key that is uniquely assigned to the authenticator process, wherein the document includes an indication that the current user of the user device was successfully authenticated on the user device, and
   convey the digitally signed authentication assertion from the authenticator process to an authentication service, in order to securely indicate to the authentication service that the current user of the user device has been verified as an authentic user by the authenticator process.

14. A user device, comprising:
processing circuitry; and
memory communicably coupled to the processing circuitry, the memory storing program code for securely asserting that a user device has successfully authenticated a current user of the user device, wherein the program code, when executed by the processing circuitry, causes the processing circuitry to:
   perform a user authentication operation, by an authenticator process executing on the processing circuitry, to verify that the current user of the user device is an authentic user, wherein the user authentication operation compares at least one user-supplied credential received from the current user of the user device to a previously stored credential, and wherein the user of the user device is successfully authenticated by the authentication operation in response to the user-supplied credential matching the previously stored credential,
   in response to the current user of the user device being successfully authenticated by the authentication operation, automatically generate, by the authenticator process, a digitally signed authentication assertion, the digitally signed authentication assertion including a document that is digitally signed using a signing key that is uniquely assigned to the authenticator process, wherein the document includes an indication that the current user of the user device was successfully authenticated on the user device, and wherein the signing key uniquely assigned to the authenticator process is stored in a key container associated with the user device and located on a key container server that is physically separate from the user device,
   convey the digitally signed authentication assertion from the authenticator process to an authentication service, in order to securely indicate to the authentication service that the current user of the user device has been verified as an authentic user by the authenticator process,
   further in response to the current user of the user device being successfully authenticated by the authentication operation, transmit, from the user device to the key container server, a request for the key container server to generate the digitally signed authentication assertion, the request for the key container server to generate the digitally signed authentication assertion causing the key container server to i) retrieve the signing key uniquely assigned to the authenticator process from the key container associated with the user device, ii) digitally sign the document, in the key container server using the signing key uniquely assigned to the authenticator process, to generate the digitally signed authentication assertion, and iii) transmit the digitally signed authentication assertion to the user device, and receive the digitally signed authentication assertion by the user device, and wherein conveying the digitally signed authentication assertion from the authenticator process to the authentication service comprises conveying the received digitally signed authentication assertion from the authenticator process to the authentication service.

15. A computer program product having a non-transitory computer readable medium which stores a set of instructions operable to securely assert that a user device has successfully authenticated a current user of the user device, the set of instructions, when executed by processing circuitry, causing the processing circuitry to:

perform a user authentication operation, by an authenticator process executing on processing circuitry of the user device, to verify that the current user of the user device is an authentic user, wherein the user authentication operation compares at least one user-supplied credential received from the current user of the user device to a previously stored credential, and wherein the user of the user device is successfully authenticated by the authentication operation in response to the user-supplied credential matching the previously stored credential;

in response to the current user of the user device being successfully authenticated by the authentication operation:

transmit, by the authenticator process from the user device to a key container server that is physically separate from the user device, a request for a signing key uniquely assigned to the authenticator process, wherein receipt by the key container server of the request for the signing key uniquely assigned to the authenticator process causes the key container server to i) retrieve the signing key uniquely assigned to the authenticator process from a key container associated with the user device, and ii) transmit the signing key uniquely assigned to the authenticator process from the key container server to the user device, wherein the key container stores a plurality of signing keys uniquely assigned to the authenticator process, each one of the plurality of signing keys uniquely assigned to the authenticator process also uniquely associated with a different application or service, wherein the request for the signing key uniquely assigned to the authenticator process includes an identifier of the user device and an identifier of an application or service that has requested that the authentication service authenticate the current user of the user device, and wherein the key container server retrieves the signing key uniquely assigned to the authenticator process by using the identifier of the user device and the identifier of the application or service that has requested that the authentication service authenticate the current user of the user device to index into a key container database, and automatically generate, by the authenticator process within the user device further in response to receipt by the user device of the signing key uniquely assigned to the authenticator process, a digitally signed authentication assertion, the digitally signed authentication assertion including a document that is digitally signed by the authenticator process using the signing key that is uniquely assigned to the authenticator process, wherein the document includes an indication that the current user of the user device was successfully authenticated on the user device; and convey the digitally signed authentication assertion from the authenticator process to an authentication service, in order to securely indicate to the authentication service that the current user of the user device has been verified as an authentic user by the authenticator process.

* * * * *